(12) United States Patent
Kobayashi et al.

(10) Patent No.: US 6,672,777 B2
(45) Date of Patent: Jan. 6, 2004

(54) LENS BARRIER DEVICE

(75) Inventors: Yuji Kobayashi, Hachioji (JP); Hiroshi Terada, Mitaka (JP); Naohiro Tsuchida, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 10/334,227

(22) Filed: Dec. 31, 2002

(65) Prior Publication Data

US 2003/0133709 A1 Jul. 17, 2003

(30) Foreign Application Priority Data

Jan. 16, 2002 (JP) ................................. 2002-007773
Jan. 16, 2002 (JP) ................................. 2002-007774
Jan. 16, 2002 (JP) ................................. 2002-007775

(51) Int. Cl.$^7$ .............................................. G03B 17/00
(52) U.S. Cl. .................................................. 396/448
(58) Field of Search ................... 396/448, 533, 396/535

(56) References Cited

U.S. PATENT DOCUMENTS

| 2,866,396 | A | * | 12/1958 | Collins | 396/448 |
| 5,294,954 | A | * | 3/1994 | Nomura et al. | 396/448 |
| 6,033,130 | A | * | 3/2000 | Muroi et al. | 396/448 |
| 6,132,110 | A | * | 10/2000 | Kume et al. | 396/448 |

* cited by examiner

*Primary Examiner*—Christopher Mahoney
(74) *Attorney, Agent, or Firm*—Frishauf, Holtz, Goodman & Chick, P.C.

(57) ABSTRACT

A lens barrier device is provided which includes an adaptor body capable of being removably attached on a taking lens frame, a lens barrier member capale of movement between a closed position covering a taking lens and an open position withdrawn from the front of the taking lens, and an engagement member capable of engagement with a filter screwthread of the lens frame. If the lens barrier member in the open position is rotated excessively by wrong manual operation, the edge of the lens barrier member presses on the engagement member, releasing the engagement with the filter screwthread and so separating the adaptor body from the lens frame, thereby protecting the lens barrier device.

4 Claims, 15 Drawing Sheets

LENS BARRIER DEVICE

This application claims the benefit of Japanese Applications No. 2002-7773, No. 2002-7774, No. 2002-7775, filed in Japan on Jan. 16, 2002, the entire contents of which are incorporated herein by reference.

BACKGROUND OF THE INVENTION

1. Field of the Invention

The present invention relates to the construction of a removable lens barrier device for protecting the front of a taking lens.

2. Description of the Related Art

A conventional lens cap for protecting a taking lens is capable of being removably attached to the front of the taking lens; in a condition in which a photograph is not being taken, this lens cap is attached to the front of the taking lens cylinder in order to protect the taking lens; when a photograph is being taken, this lens cap is removed, so that photography can be performed.

However, when a conventional lens cap as described above is removed, this lens cap must be stored and a location for storing this lens cap must be secured, so the use of a lens cap is troublesome and the possibility exists of the lens cap being lost after it has been removed.

Another type of conventional lens barrier device for lens protection arranged at the front of a taking lens comprises a barrier member that is capable of being rotated between a position that covers the front of the taking lens and an open position. When in the open position, this barrier member is held with being in contact with a stop member that is arranged in the vicinity of the axis of the aforementioned rotation.

However, with the conventional lens barrier device as described above, in the open condition of the barrier, there is a possibility of the barrier member accidentally coming into contact with an external obstacle. This leads to considerable stress being produced in the portions around the axis of rotation of the barrier member because the barrier member is in contact with the stop member, with the risk of damaging this, depending on the magnitude of the force of contact.

SUMMARY OF THE INVENTION

In view of the above, the present invention comprises a removable lens barrier device that protects the front of a taking lens, featuring the provision of a lens barrier device that is easy to use in that there is no need to detach the lens barrier device from the taking lens cylinder when a photograph is taken and further in which damage to the device can be prevented even if the barrier section accidentally comes into contact with some obstacle in the open condition or is subjected to wrong manual operation.

A lens barrier device according to one aspect of the present invention comprises a barrier movable between a position covering a front of a taking lens and a position withdrawn from the front of the taking lens, an engagement member capable of engagement with a filter screwthread of the taking lens in order to hold the barrier on the taking lens, and a rotary shaft that rotates the barrier section between the position covering the front of the taking lens and the position withdrawn from the front of the taking lens.

According to another aspect of the present invention, a lens barrier device comprises attaching means capable of removably attaching the lens barrier device to a filter screwthread of a taking lens, a barrier that is movable between a position covering the front of the taking lens and a position withdrawn from the front of the taking lens and attachment release means for releasing attachment of the lens barrier device to the filter screwhead by operation of the barrier when the barrier is moved beyond the position withdrawn from the covering position. Thus, the attached condition is released by the attachment release means by operation of the barrier.

Other features and benefits of the present invention will become apparent from the following description.

DESCRIPTION OF THE PREFERRED EMBODIMENTS

Embodiments of the present invention are described below with reference to the drawings.

Figure 1A:
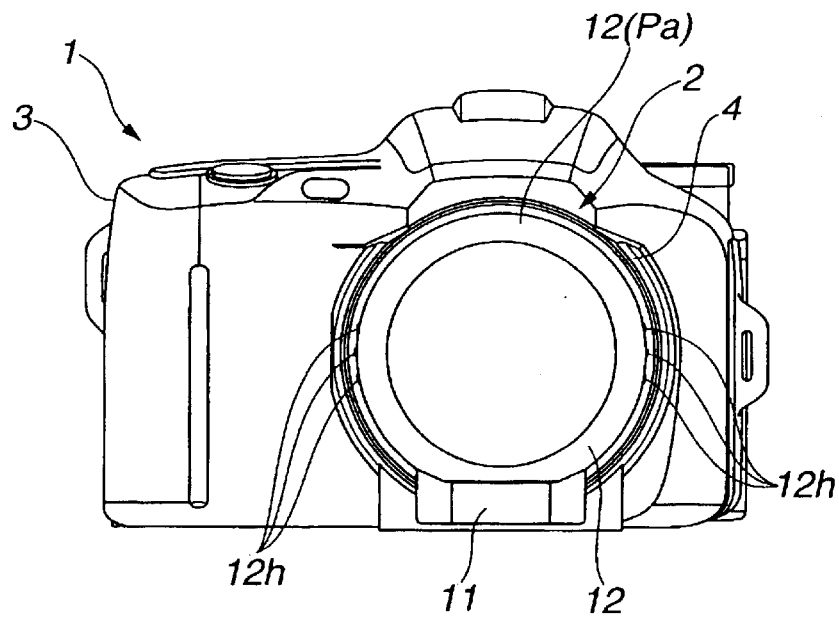
FIG. 1A is a front view in the lens barrier closed condition and in the lens cylinder retracted condition of a camera on which a lens barrier device according to a first embodiment of the present invention is attached.
Figure 1B:
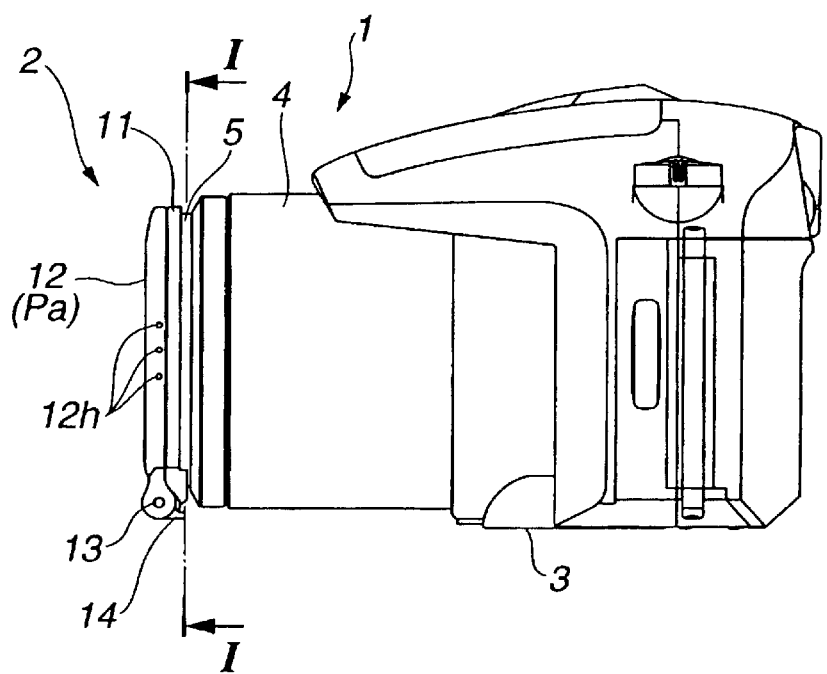
FIG. 1B is a side view in the lens barrier closed condition and in the lens cylinder retracted condition of a camera on which a lens barrier according to FIG. 1A above is attached.
Figure 2A:
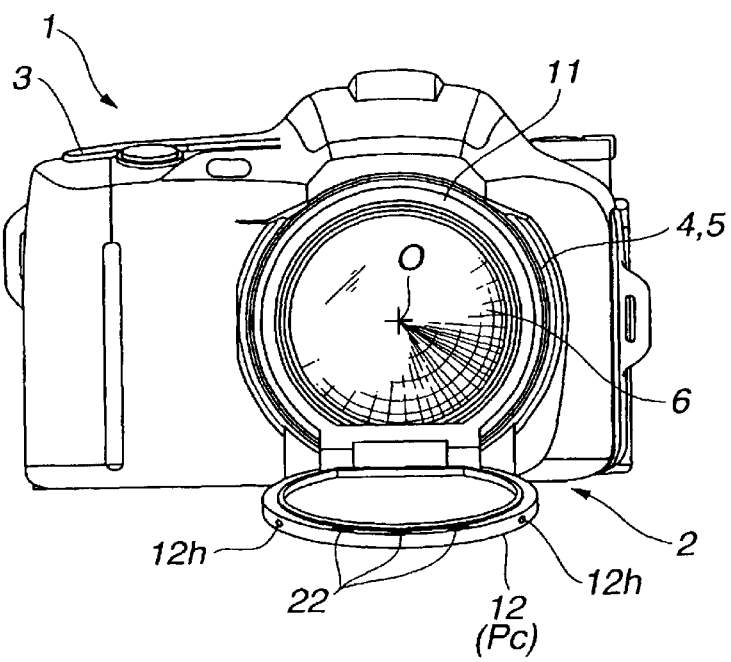
FIG. 2A is a front view in the lens barrier open condition and in a condition in which the lens cylinder is extended into a position in which a photograph can be taken, of a camera on which a lens barrier device according to FIG. 1A is attached.
Figure 2B:
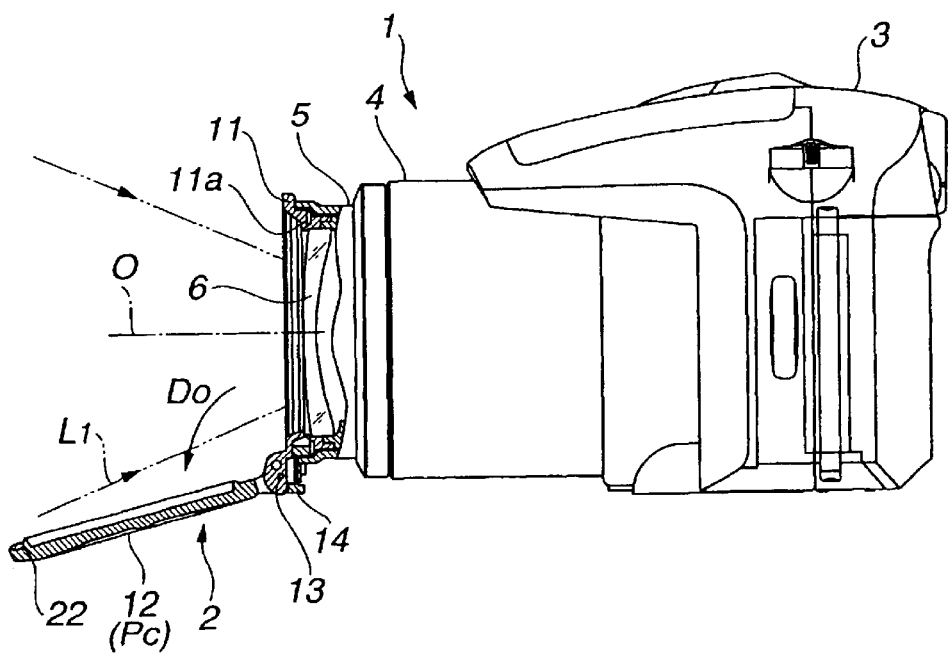
FIG. 2B is a side view in the lens barrier open condition and in a condition in which the lens cylinder is extended into a position in which a photograph can be taken, of a camera on which a lens barrier device according to FIG. 1A is attached.

FIGS. 1A and 1B and FIGS. 2A and 2B are a front view and side view of a camera on which a lens barrier device according to a first embodiment of the present invention is attached, FIGS. 1A and 1B showing the lens cylinder retracted condition in the closed condition of the lens barrier device and FIGS. 2A and 2B showing the condition in which the lens cylinder is extended to a position in which a photograph can be taken, in the open condition of the lens barrier device.

The lens barrier device (lens cap device) 2 of this embodiment chiefly comprises an adaptor body 11 and a lens barrier member (lens cap member) 12 constituting a barrier of the mobile member (rotary member) and is attached in a removable manner, with the adaptor body 11 interposed, on the filter screwthread of the lens frame 5 of the lens cylinder 4 on the side of the camera body 3 of the camera 1. The most forward stage taking lens 6 is held by this lens frame 5.

The lens barrier member 12 is freely rotatably supported in a state in which click action means is interposed, to be described, on the adaptor body 11 and is capable of rotation between a closed position Pa covering the front of the taking lens 6 and an open position Pc in which it is retracted from the front of the taking lens 6, by a manual rotation operation in the direction D0 or in the opposite direction to D0 about a rotary shaft 13 along a plane perpendicular to the optical axis O of the lens frame 5 in FIG. 2. When the lens barrier member 12 is in the open position Pc, the above lens barrier member 12 is retracted to outside L1, which shows the range of the luminous flux of the photographic subject captured by the taking lens 6, as shown in FIG. 2B.

Minute projections 12h for the manual opening/closing operation are provided on the left and right side faces of the lens barrier member 12 and a rubber member 22 constituting a resilient member for damping impacts with the adaptor body 11 is provided at an upper position on the inside face of the lens barrier member 12.

Further details of the construction of the lens barrier device 2 will be described with reference to FIGS. 3 to 10.

Figure 3:
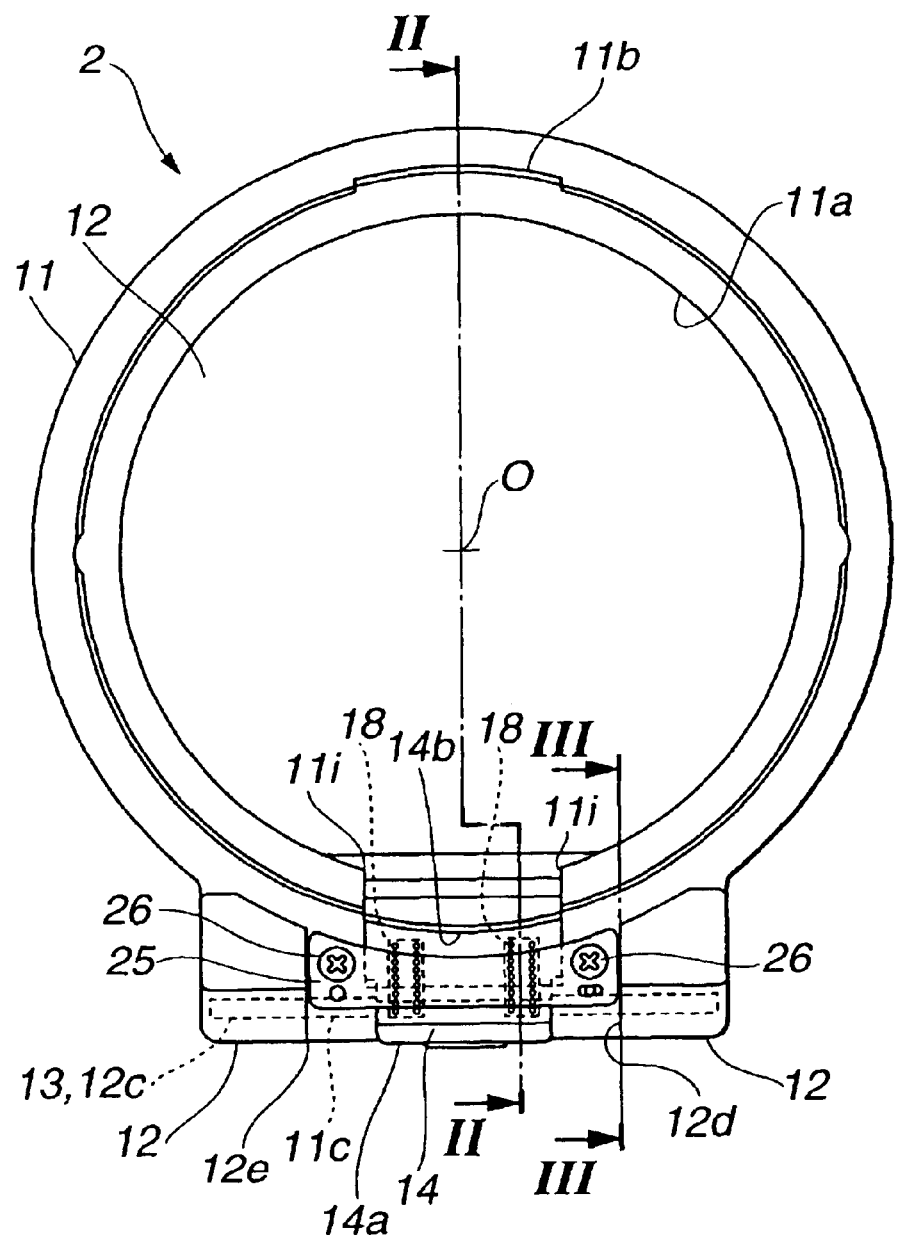
FIG. 3 is a cross-sectional view along the line I—I of FIG. 1B, being a view in a lens barrier device unit seen from the taking lens side of the closed condition of the lens barrier device of FIG. 1A.
Figure 4:
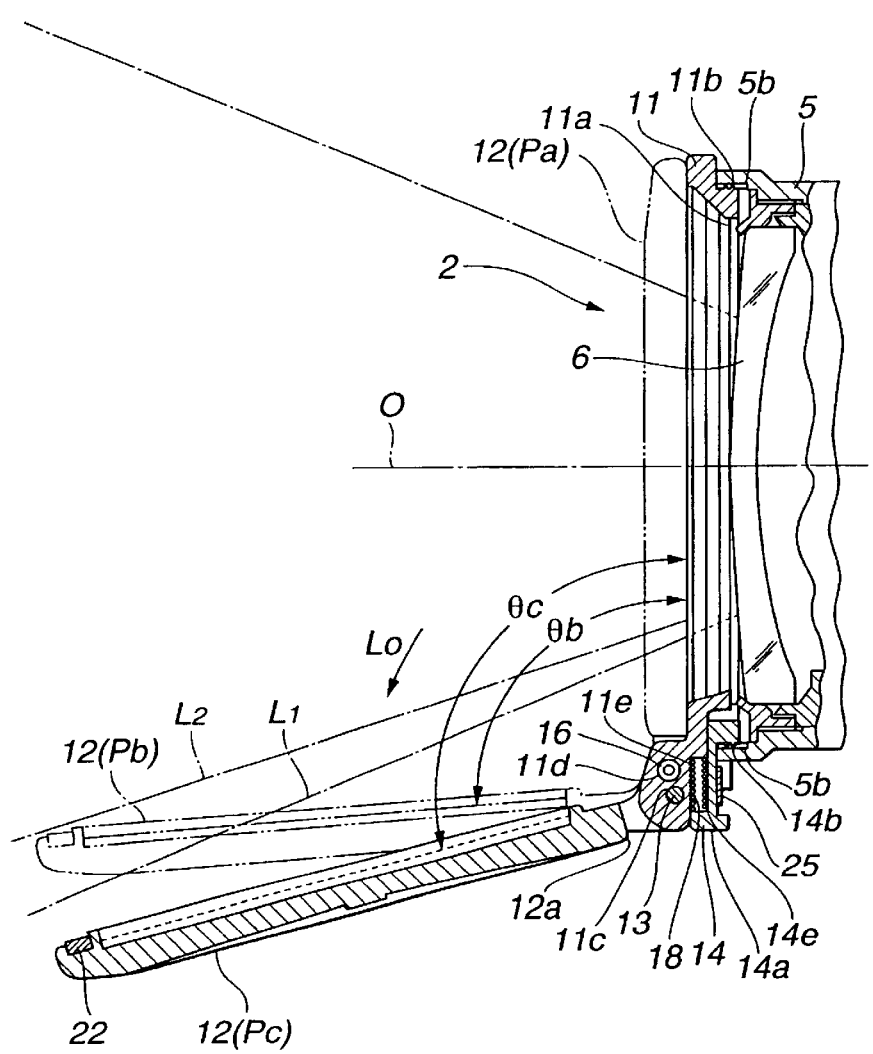
FIG. 4 is a view wherein the opening action condition of the lens barrier device of FIG. 1A is shown by a cross section along the line II—II of FIG. 3.
Figure 5:
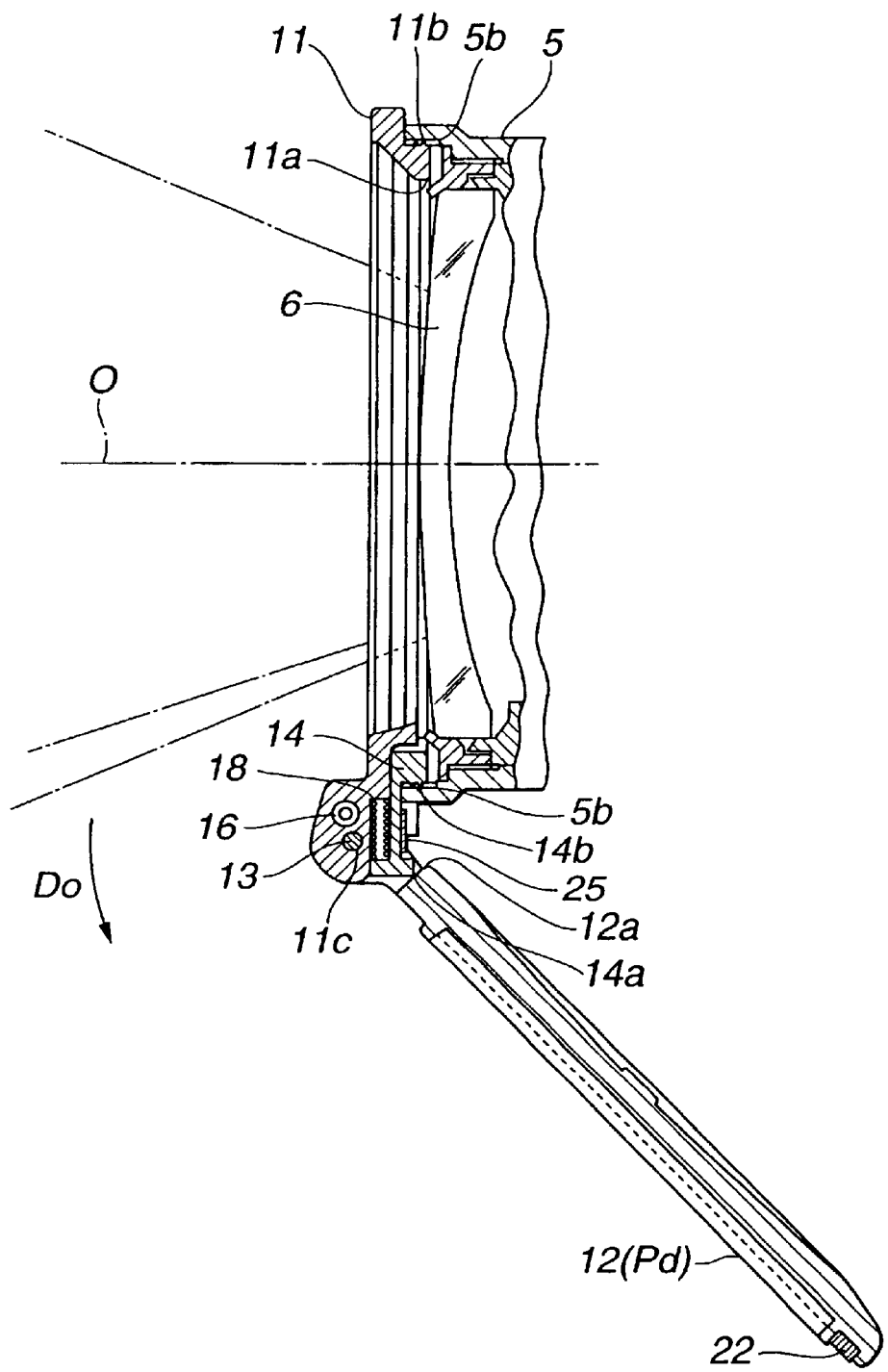
FIG. 5 is a view wherein the condition in which the action of an external force on a lens barrier member of the lens barrier device of FIG. 1A has displaced it from the lens frame is shown by a cross section along the line II—II of FIG. 3.
Figure 6:
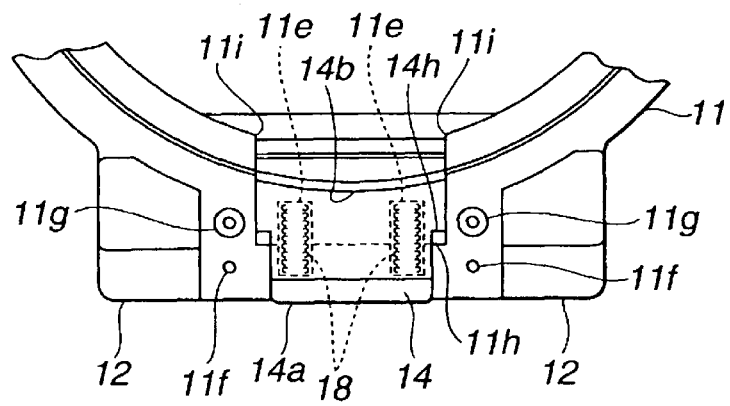
FIG. 6 is a view wherein the vicinity of the engagement member in a condition in which the engagement member pressing plate of the lens barrier device of FIG. 1A has been displaced is shown by a cross section along the line I—I of FIG. 1B.
Figure 7:
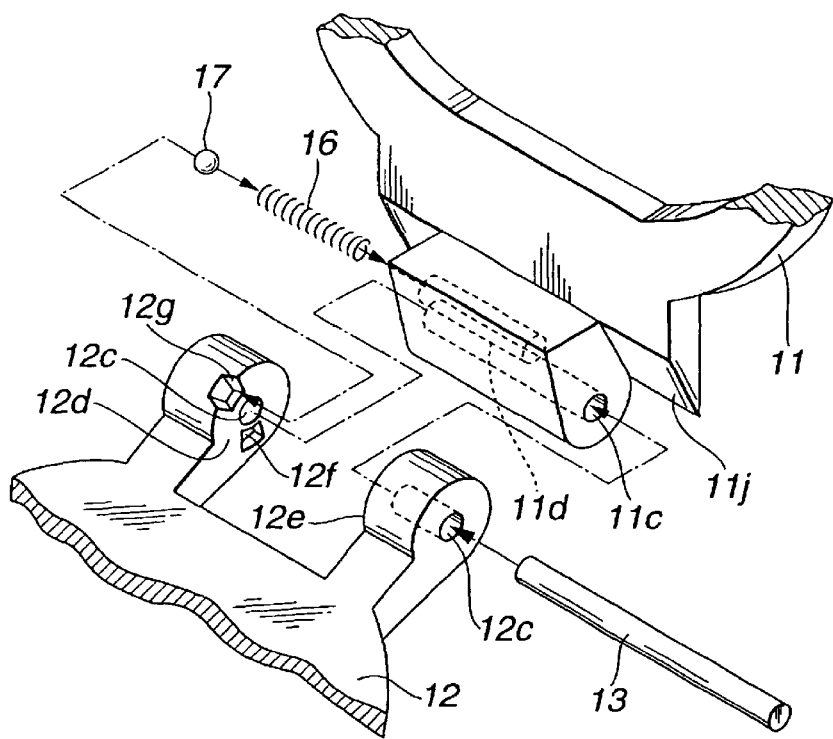
FIG. 7 is an exploded perspective view of the click action support of an adaptor body and lens barrier member of a lens barrier device according to FIG. 1A.
Figure 8:
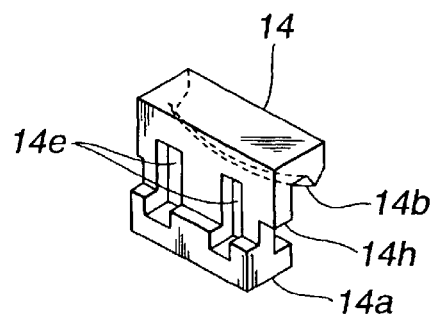
FIG. 8 is a perspective view of an engagement member of a lens barrier device according to FIG. 1A.
Figure 9A:
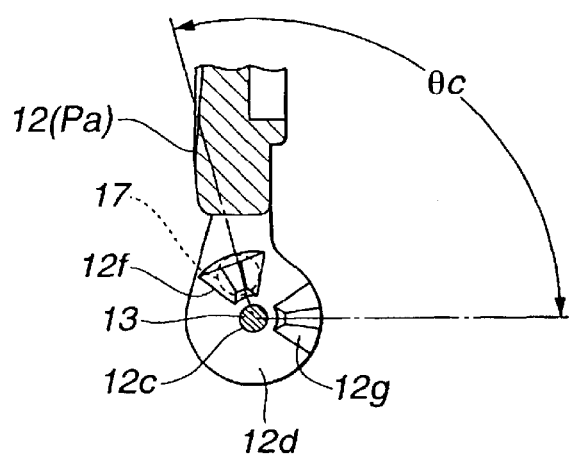
FIG. 9A is a view showing the condition of the click action recess when the lens barrier member of the lens barrier device of FIG. 1A is in the closed position by a cross section along the line III—III of FIG. 3.
Figure 9B:
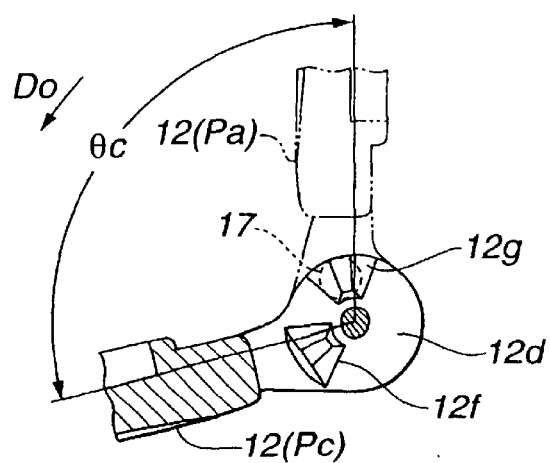
FIG. 9B is a view showing the condition of the click action recess when the lens barrier member of the lens barrier device of FIG. 1A is in the open position by a cross section along the line III—III of FIG. 3.
Figure 10A:
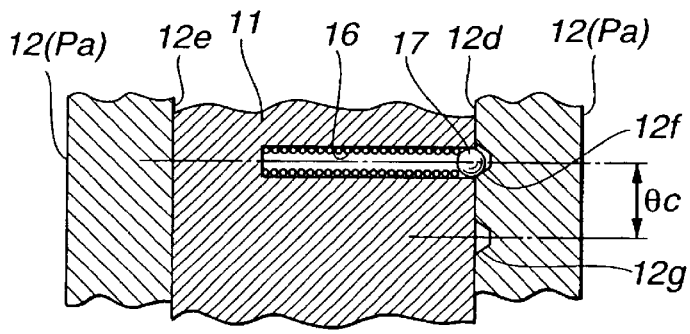
FIG. 10A is a development showing the engaged condition of the click action recess and the click action ball when the lens barrier member of the lens barrier device of FIG. 1A is in the closed position.
Figure 10B:
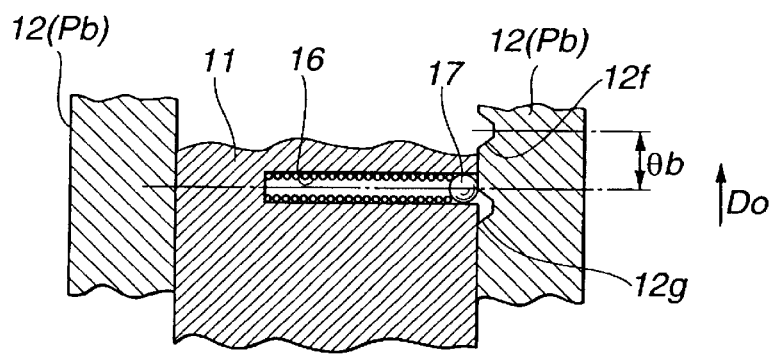
FIG. 10B is a development showing the engaged condition of the click action recess and the click action ball when the lens barrier member of the lens barrier device of FIG. 1A has moved to outside the field of view of the range-finder.
Figure 10C:
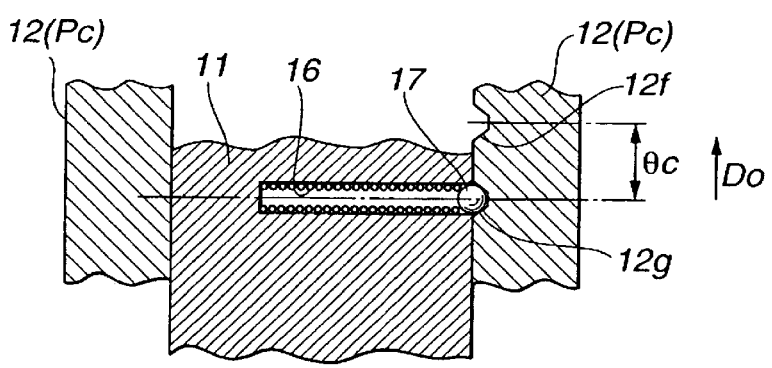
FIG. 10C is a development showing the engaged condition of the click action recess and the click action ball when the lens barrier member of the lens barrier device of FIG. 1A is in the open position.

FIG. 3 is a view of the lens barrier device in the closed condition seen from the side of the taking lens, being a sectional view along the line I—I of FIG. 1B. FIG. 4 is a view in which the open condition of the lens barrier device is shown by a cross section along the line II—II of FIG. 3. FIG. 5 is a view wherein the condition in which the action of an external force on a lens barrier member has displaced the lens barrier device from the lens frame is shown by a cross section along the line II—II of FIG. 3. FIG. 6 is a view showing a cross section along the line I—I of FIG. 1B showing the vicinity of the engagement member of the lens barrier device in a condition in which the engagement member pressing plate has been removed. FIG. 7 is an exploded perspective view of the click action support of the adaptor body and lens barrier member. FIG. 8 is a perspective view of an engagement member of the lens barrier device. FIGS. 9A and 9B are views showing the condition of the click action recess of the lens barrier member of the lens barrier device by cross sections along the line III—III of FIG. 3, FIG. 9A being a view when the cap member is in the closed position and FIG. 9B when the lens barrier member is in the open position. FIG. 10A, FIG. 10B and FIG. 10C are developments showing change of the engaged condition of the click action recess and the click action ball of the lens barrier device, FIG. 10A being a development when the lens barrier member is in the closed position, FIG. 10B when the lens barrier member has moved to outside the field of view of the range-finder and FIG. 10C when the lens barrier member is in the open position, respectively.

The lens barrier device 2 of this embodiment comprises an adaptor body 11 that is removably attached to the lens frame 5 by means of a filter screwthread 5b, a lens barrier member (cap member) 12 constituting a barrier that is removably supported by a rotary shaft 13 with respect to the adaptor body 11, a ball click action section constituting click action means for positional location of the lens barrier member 12 in a closed position Pa and open position Pc with respect to the adaptor body 11, an engagement member 14 constituting attaching means (releasable attaching means) capable of engagement or release of the lens frame 5 with respect to the filter screwthread 5b, an engagement spring 18 comprising two compression springs for biasing the engagement member 14 in the engagement direction and a pressing plate 25 that presses the engagement member 14.

As shown in FIG. 3 and FIG. 4 etc, the adaptor body 11 is a ring-shaped member comprising an aperture 11a corresponding to the aperture of the taking lens 6 having an optical axis O in the middle, an engagement section 11b capable of engagement with the filter screwthread (female screwthread) 5b of the lens frame 5 on the rear side of the upper portion thereof, a rotary shaft hole 11c along the left/right direction of the lower portion thereof, a click action ball hole lid provided parallel with the rotary shaft hole 11c in the vicinity of this rotary shaft hole 11c, a sliding recess 11i along the direction perpendicular to the optic axis O (direction of the diameter of the taking lens), having a step 11h at the rear side of the lower portion thereof, an engagement spring insertion recess 11e provided on the inside of the sliding recess 11i and a screw hole 11g for attaching the pressing plate, etc.

The engagement section 11b is shaped as an arcuate projection of prescribed width capable of engagement with the filter screwthread 5b; it does not need to have a screw lead section, but could be provided with a lead section.

The ball click action section comprises a click action ball 17 constituting a first click action engagement member with the click action spring 16, which is a compression spring; the click action ball 17 is inserted after insertion of the click action spring 16 in the click action ball hole lid of the adaptor body 11. The click action ball 17 is biased by the click action spring 16, being held in a condition in which it is capable of projecting towards the side of the inside wall face 12d of the lens barrier member 12, to be described, and is capable of sliding contact with the click action recesses 12f and 12g, to be described (FIGS. 7 and 10).

The lens barrier member 12 is a disk-shaped member that covers the aperture 11a of the adaptor body 11 and comprises rotary shaft holes 12c for insertion of the rotary shaft 13 provided in two supports in the lower part thereof, a click action recess 12f which is a first recess constituting click action means of substantially the same shape provided in the vicinity of the rotary shaft hole 12c on one inside wall face 12d of the inside wall faces 12e and 12d opposite the support, a click action recess 12g constituting a second recess and an edge section 12a forming attachment release means of the engagement member 14, provided at the bottom edge thereof etc.

The angle of arrangement of the two click action recesses 12f and 12g is arranged to be substantially equal to the angle of rotation θc of opening/closing of the lens barrier member 12 and their respective recess widths in the circumferential direction are such as to achieve positional location of the click action ball 17.

The engagement member 14 is slidably inserted in the sliding recess 11i of the adaptor body 11 as shown in FIGS. 6 and 8 and comprises an engagement projection 14b of arcuate shape capable of engagement with the filter screwthread 5b of the lens frame 5, an insertion recess 14e of the engagement spring 18 and a lower end face 14a that is pressed against by the edge 12a of the lens barrier member 12.

The engagement member 14 is pressed by the pressing plate 25 with being inserted into the sliding recess 11i and is supported in such a way that it is capable of sliding in a direction perpendicular to the optic axis O (direction of the diameter of the taking lens). In the condition in which the lens barrier device 2 is attached on the lens frame 5, the engagement projection 14b is engaged with the filter screwthread 5b of the lens frame 5 or its engaged condition is released, by a sliding movement of the engagement member 14.

It should be noted that, although the engagement member 14 is held biased outwardly by the engagement spring 18, in the condition in which the lens barrier device is removed, a step 11h of the sliding recess 11i and a step 14h of the engagement member 14 are held in an abutting condition. Also, so long as the engagement projection 14b is of an arcuate shape of prescribed width capable of engagement with the filter screwthread 5b, a screw lead section is unnecessary; however, it could be provided with a lead section. Also, the pressing plate 25 is fixed by a screw hole 11g of the adaptor body 11 by a screw 26, being located in position by a positional location pin 11f.

Next, the attaching/removing and opening/closing action of the lens barrier device 2 with respect to the lens frame 5 in this embodiment constructed as described above will be described.

When the lens barrier device 2 is attached to the lens frame 5, the lower end face 14a of the engagement member 14 is pressed against the engagement spring 18 so that the adaptor body 11 is inserted into the filter screwthread 5b of the lens frame 5; when the lower end 14a thereof is released, as shown in FIG. 4, the engagement section 11b of adaptor body 11 and the engagement projection 14b of the engagement member 14 are engaged with the filter screwthread 5b, so that the lens barrier device 2 is put into attached condition.

In the attached condition of the lens barrier device 2, when the lens barrier member 12 is in the closed position Pa covering the taking lens 6 (FIGS. 1A and 1B), the click action ball 17, as shown in FIGS. 9A and 10A, is inserted into the click action recess 12f of the lens barrier member 12 and the lens barrier member 12 is held in the closed position Pa by being subjected to a prescribed click action force. In this condition, the click action ball 17 is arranged to come into contact with the inclined face on the inside of the click action recess 12f so that the lens barrier member 12 is put into a condition in which it is pressed in the direction of the closed position Pa and is thus held in a securely located condition.

As shown in FIG. 4, in order to put the lens barrier device 2 in the open condition, the lens barrier member 12 is manually rotated in the D0 direction. The click action ball 17 escapes from the click action recess 12f by means of this manual rotation operation. When, after rotating through an angle θb, the lens barrier member 12 reaches the position Pb outside L2, which indicates the range of the luminous flux of the field of view of the range finder and is the range of the luminous flux of the photographic subject, as shown in FIG. 10B, the click action ball 17 approaches the inclined face of another click action recess 12g. Thereafter, the lens barrier member 12 is positively rotated in the direction D0 by application of biasing force in the opening direction by the click action ball 17.

Then, when, as shown in FIG. 4, FIG. 9B and FIG. 10C, the lens barrier member 12 is rotated to the angle of opening θc, the click action ball 17 is inserted into the click action recess 12g. On reaching the open position Pc, retracted from L1, which indicates the range of luminous flux of the subject of photography, the lens barrier member 12 is held by being subjected to a prescribed click action force with the result that the camera 1 assumes a condition in which a photograph can be taken (FIGS. 2A and 2B).

If, when the lens barrier member 12 reaches the open position Pc described above, the lens barrier member 12 accidentally comes into contact with some obstacle, causing the lens barrier member 12 to be moved too far by mistake, with the result that further external force acts on the lens barrier member 12 in the direction D0, the click action ball 17 escapes from the click action recess 12g, allowing the lens barrier member 12 to escape by rotational movement leeway in the direction D0, thereby preventing damage being caused by this external force.

Furthermore, if external force exceeding the range of rotational movement leeway acts on the lens barrier member 12, as shown in FIG. 5, when the lens barrier member 12 rotates as far as the vicinity of the rotational position Pd, the bottom end face 14a of the engagement member 14 is pressed by the edge 12a of the lens barrier member, causing the engagement member 14 to execute sliding movement in the upwards direction (direction approaching the optic axis O). Due to this sliding movement, the engagement between the engagement projection 14b and the filter screwthread 5b of the lens frame 5 is released. The lens barrier device 2 is thereby separated from the lens frame 5, preventing damage due to the external force.

It should be noted that, when, as described above, the lens barrier member 12 rotates to a large extent, the rotary shaft support of the lens barrier member 12 comes into contact with a contact face 11j in the vicinity of the rotary shaft of the adaptor body 11, thereby preventing the lens barrier member 12 from being relatively rotated beyond a prescribed angle with respect to the adaptor body 11, and so protecting the vicinity of the rotary shaft support.

As described above, after opening of the lens barrier device 2, in order to put this in the closed condition, the lens barrier member 12 is manually rotated in the direction opposite to D0, thereby returning to the open position Pa of FIGS. 1A and 1B; in this way, the lens barrier device 2 can be put in the closed condition.

With a lens barrier device 2 according to the embodiment described above, the lens barrier device can be attached to and removed from the lens frame 5 in a straightforward fashion and there is no need to remove the lens barrier device 2 when a photograph is being taken, so the taking lens can be put into the open condition simply by manual rotary operation of the lens barrier member. Also, since there is no need to remove the lens barrier device 2 when a photograph is taken, there is no risk of this being lost etc, so the user can concentrate on taking of the photograph.

Thus, even if the lens barrier member 12, when in the open position Pc, accidentally comes into contact with some obstacle or is wrongly operated, when the lens barrier device 2 is in the open condition, damage to the lens barrier device 2 is prevented by rotational leeway in the opening direction. Also, if even greater rotation of the lens barrier member 12 takes place, the engagement member 14 is slidably driven by the lens barrier member 12 so that engagement between the adaptor body 11 and the filter screwthread 5b of the lens frame 5 is disengaged. This release of the engaged state prevents damage to the lens barrier device 2.

Next, a lens barrier device according to a second embodiment of the present invention will be described with reference to FIGS. 11 to 16.

Figure 11:
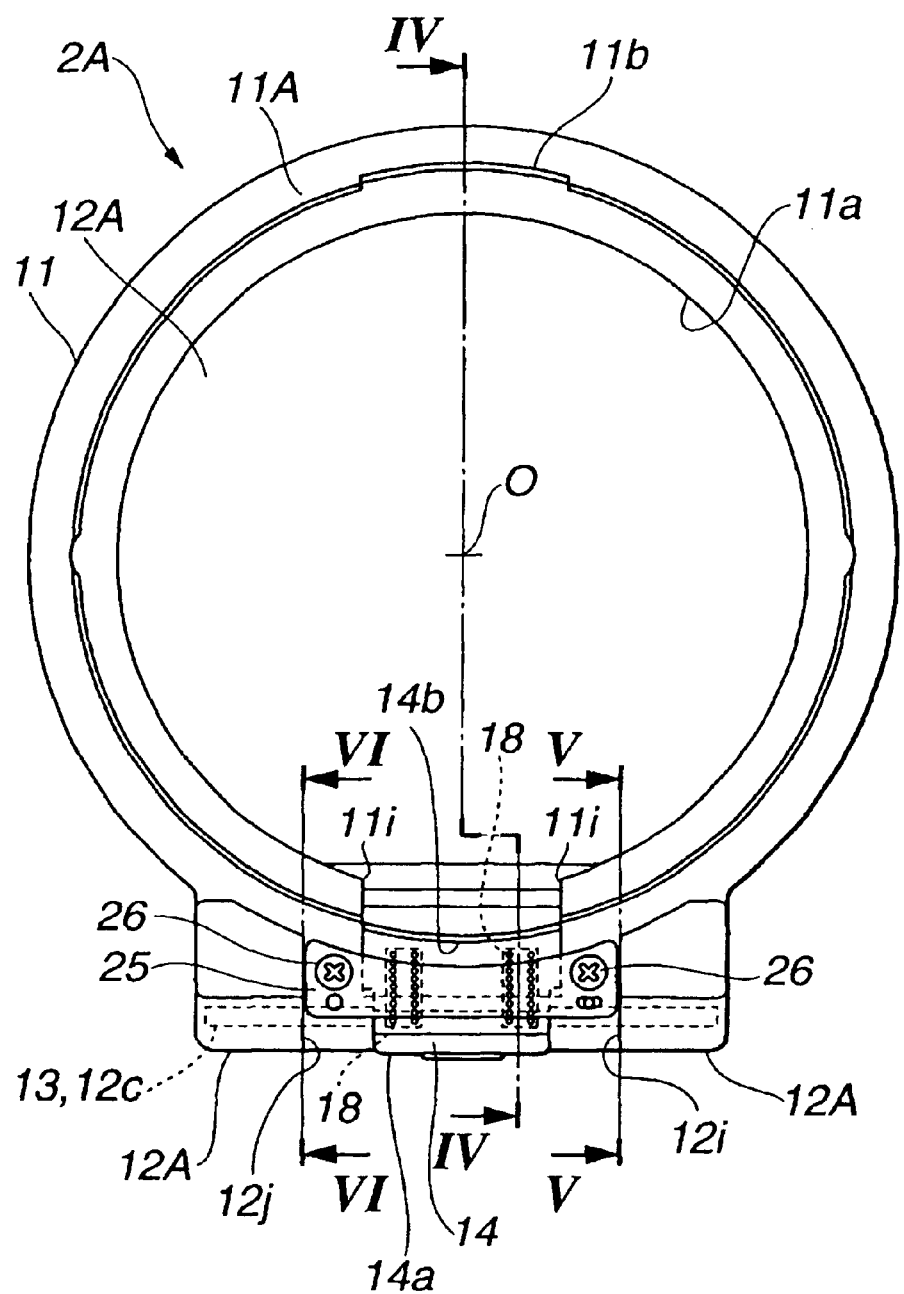
FIG. 11 is a view in the lens barrier device unit seen from the side of the taking lens of the closed condition of the lens barrier device according to a second embodiment of the present invention.
Figure 12:
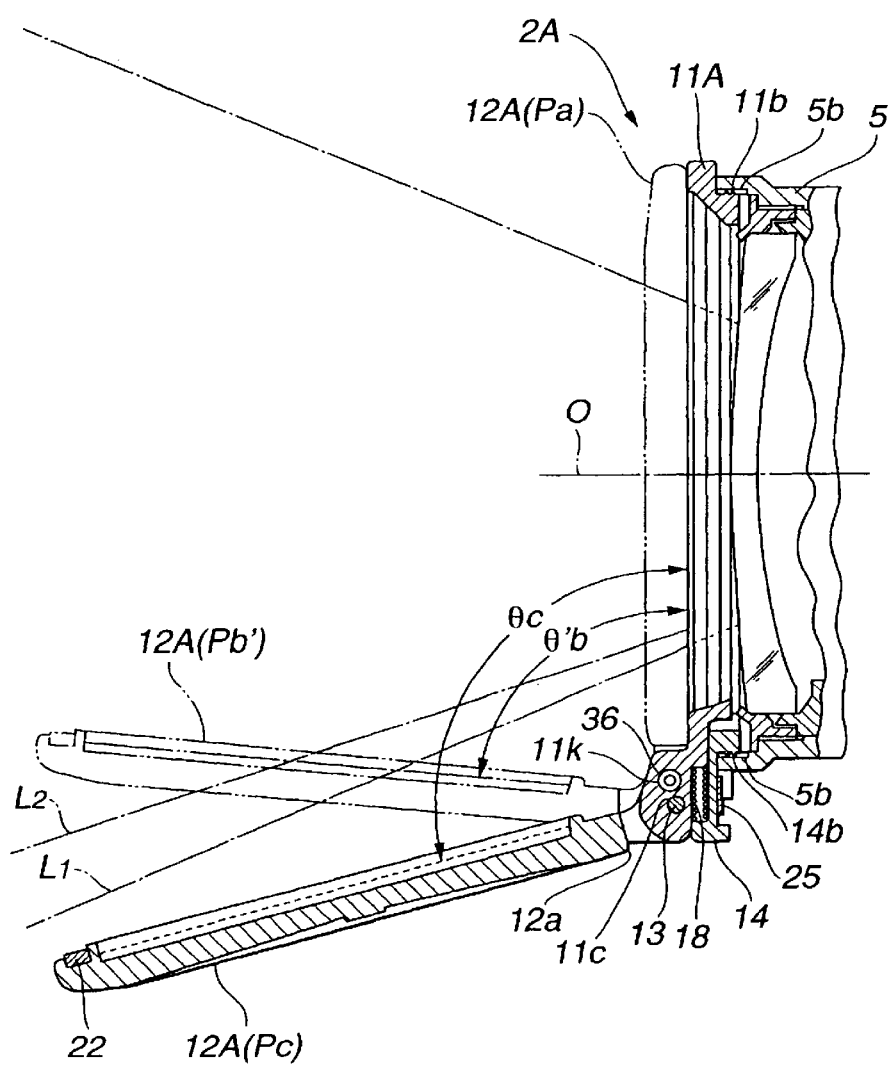
FIG. 12 is a sectional view along the line IV—IV of FIG. 11, showing the opening action condition of the lens barrier device.
Figure 13:
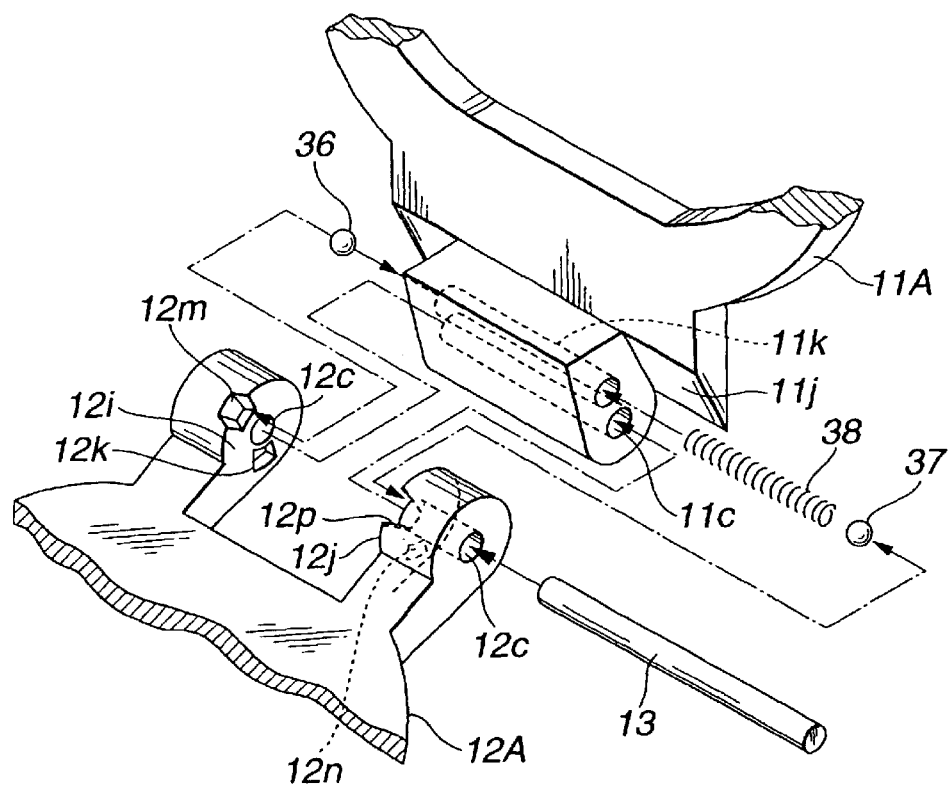
FIG. 13 is an exploded perspective view of the click action support of the lens barrier member and the adaptor body of the lens barrier device of FIG. 11.
Figure 14A:
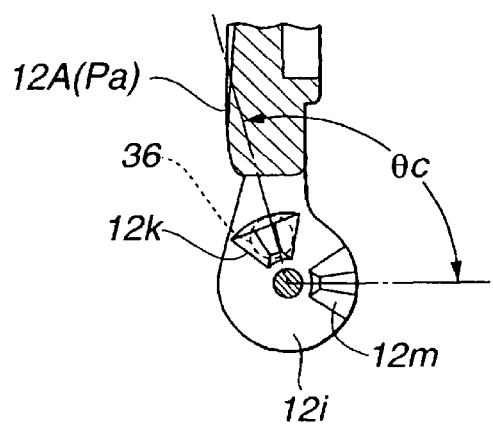
FIG. 14A is a view shown by a cross section along the line V—V of FIG. 11 of the condition of the click action recess when the lens barrier member of the lens barrier device of FIG. 11 is in the closed position.
Figure 14B:
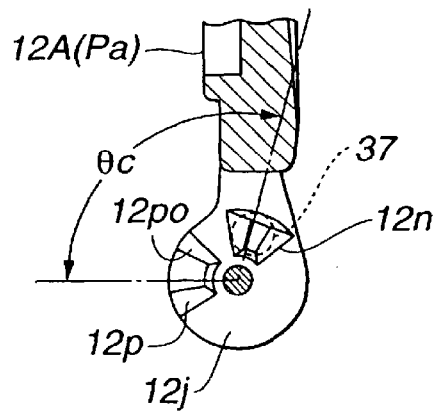
FIG. 14B is a view shown by a cross section along the line VI—VI of FIG. 11 of the condition of the click action recess when the lens barrier member of the lens barrier device of FIG. 11 is in the closed position.
Figure 15A:
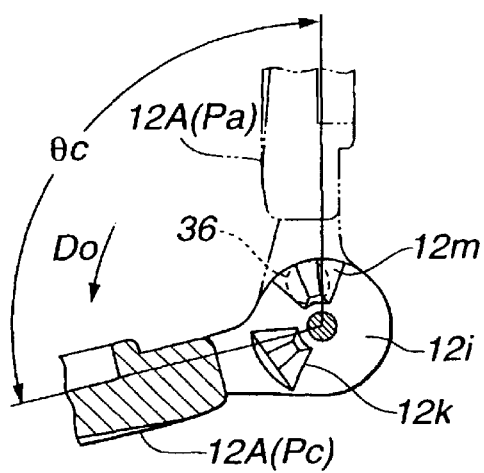
FIG. 15A is a view shown by a cross section along the line V—V of FIG. 11 of the condition of the click action recess when the lens barrier member of the lens barrier device of FIG. 11 is in the open condition.
Figure 15B:
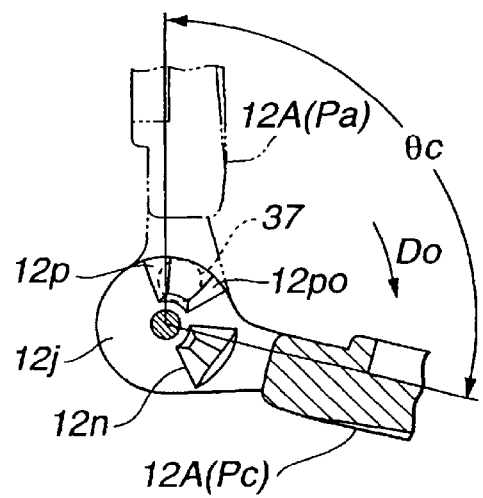
FIG. 15B is a view shown by a cross section along the line VI—VI of FIG. 11 of the condition of the click action recess when the lens barrier member of the lens barrier device of FIG. 11 is in the open position.
Figure 16A:
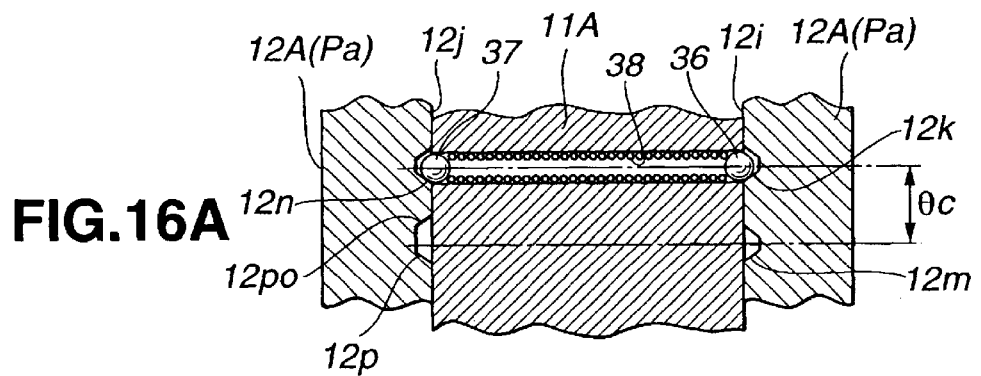
FIG. 16A is a development showing the engaged condition of the click action recess and the click action ball when the lens barrier member of the lens barrier device of FIG. 11 is in the closed position.
Figure 16B:
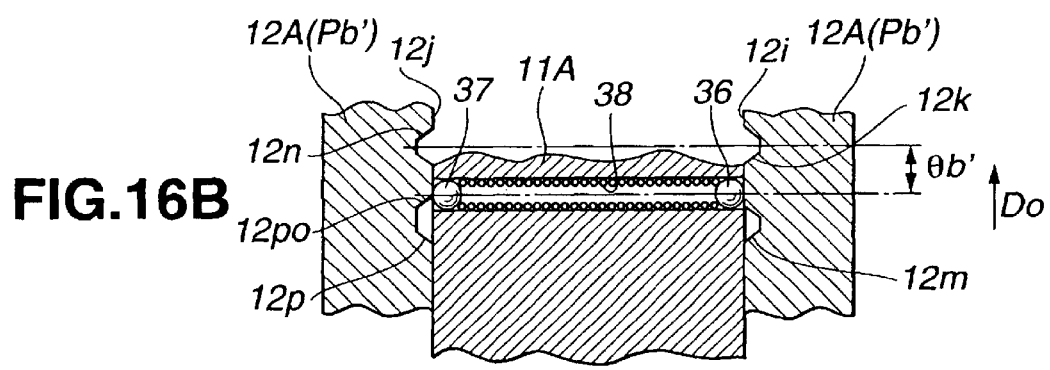
FIG. 16B is a development showing the engaged condition of the click action recess and the click action ball when the lens barrier member of the lens barrier device of FIG. 11 is still within the field of view of the range-finder.
Figure 16C:
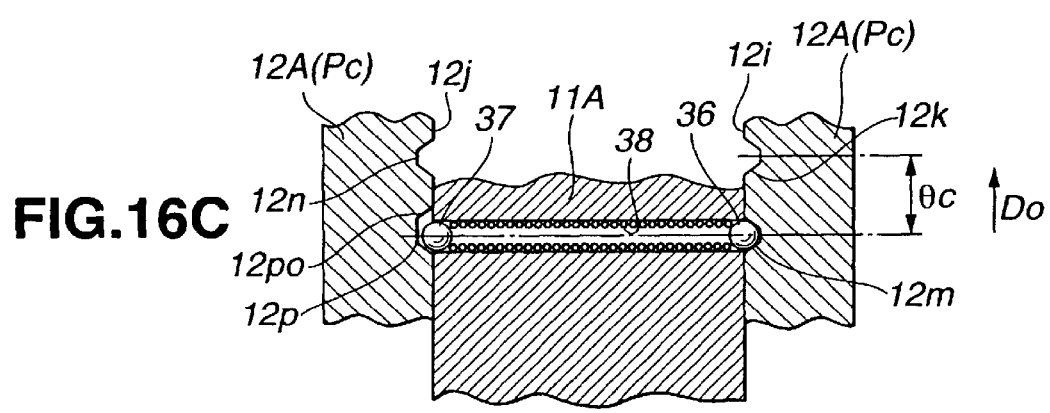
FIG. 16C is a development showing the engaged condition of the click action recess and the click action ball when the lens barrier member of the lens barrier device of FIG. 11 is in the open position.

FIG. 11 is a view of the lens barrier device in the closed condition seen from the side of the taking lens. FIG. 12 is a sectional view along the line IV—IV of FIG. 11, showing the opening action state of the lens barrier device. FIG. 13 is an exploded perspective view of the click action support of the lens barrier member and the adaptor body of the lens barrier device. FIGS. 14A and 14B are views showing the state of the click action recess when the lens barrier member of the lens barrier device is in the closed position, FIG. 14A showing a cross section along the line V—V of FIG. 11 and FIG. 14B showing a cross section along the line VI—VI of FIG. 11. FIGS. 15A and 15B are views showing the state of the click action recess when the lens barrier member of the lens barrier device is in the open condition, FIG. 15A showing a cross section along the line V—V of FIG. 11 and FIG. 15B showing a cross section along the line VI—VI. FIGS. 16A, 16B and 16C are developments showing the engaged state of the click action recess and the click action ball of the lens barrier device, FIG. 16A being a development when the lens barrier member is in the closed position, FIG. 16B being a development when the lens barrier member is still within the field of view of the range-finder (within the range of the luminous flux of the photographic subject) and FIG. 16C being a development when the lens barrier member is in the open position, respectively.

In regard to the lens barrier device 2A of this embodiment, only the construction of the vicinity of the click action section is different from that of the lens barrier device 2 of the first embodiment described above, the rest of the construction is the same. Hereinbelow the portions that are different will be described and structural members which are the same will be described by giving them the same reference symbols as those of the structural members of the first embodiment.

In the case of the lens barrier device 2 of the first embodiment, in the condition in which the lens barrier member 12 is in the course of undergoing a manual opening operation, when the lens barrier member 12 is at a position Pb' (FIG. 12) within L2 which indicates the range of luminous flux of the range finder within the range of the luminous flux of the photographic subject, or when the lens barrier member 12 is in the position Pb (FIG. 4) which is outside L2, but is struck by the luminous flux of photography, if the user happens to stop the manual rotary action, click action biasing force in the opening direction does not act thereon since the click action ball 16 has not approached the inclined face of the click action recess 12g, so that the lens barrier member 12 stops in this position. In particular, when the lens barrier member 12 is in the aforesaid position Pb, the presence cannot be detected even by the range finder, so there is a possibility that a photograph could be taken whilst still in this condition. If photography is performed in this condition, exposure occurs with an unstable amount of light striking the photographic subject, so the results of the photography are unsatisfactory. The user must therefore exercise considerable care by ascertaining the position of the lens barrier member and if he finds that this is stopped at some point during the course of the rotation, must again manually rotate the lens barrier member 12 to the open position Pc by a manual pressing operation; as this, ease of use is unsatisfactory. The lens barrier device 2A of this embodiment effects an improvement in particular to improve the inefficiency of use, as described above.

The lens barrier device 2A of this embodiment comprises an adaptor body 11A, a lens barrier member (cap member) 12A which is a barrier for the moveable member (rotary member) and a ball click action section which is click action means for positional location of the lens barrier member 12A. In addition, it comprises an engagement member 14 which is attaching means (releasable attaching means), two engagement springs 18 for biasing the engagement member 14 in the engagement direction and a pressing plate 25 that presses the engagement member 14, like those of the first embodiment.

As shown in FIG. 13, the ball click action section comprises a click action spring 38 consisting of a compression spring, a click action ball 36 which is a first click action engagement member, and a click action ball 37 which is a second click action engagement member, these constituting a pair. All of these, i.e., a click action spring 38, click action balls 36 and 37 are inserted on the inside of a click action ball through-hole 11k provided parallel with the rotary shaft hole 11c of the adaptor body 11A. Being inserted outside the click action spring 38 and biased outwardly, the click action balls 36 and 37 are held in a condition in which they are respectively capable of projecting towards the inside wall face 12i and towards the inside wall face 12j of the lens barrier member 12A, to be described.

Furthermore, in the above lens barrier member 12A, as click action means, a click action recess 12k which is a first recess and a click action recess 12m which is a second click action recess are provided in the vicinity of the rotary shaft hole 12c bored in one inside wall face 12i of the two supports that are provided with a rotary shaft hole 12c. Furthermore, a click action recess 12n which is a first recess and a click action recess 12p which is a third recess are arranged in the vicinity of the rotary shaft hole 12c bored in the other inside wall face 12j of the supports.

The click action ball 36 is capable of sliding in and contacting the click action recesses 12k and 12m and the click action ball 37 is capable of sliding in and contacting the click action recesses 12n and 12p.

Also, as shown in FIGS. 14A, 14B, 15A and 15B, the click action recesses 12k and 12m have an angle of arrangement with respect to the center of the rotary shaft 13 that is substantially equal to the opening/closing angle of rotation θc of the lens barrier member 12A, the width of the recesses in their respective circumferential directions being a recess width capable of positioning the click action ball 36.

The click action recess 12n is arranged in a position facing the click action recess 12k and the recess widths in the circumferential direction thereof are the same as the recess width of the click action recess 12k, being such as to make it possible to achieve positional location of the click action ball 37. Furthermore, the click action recess 12p comprises an inclined face 12 p0 at a position in the circumferential direction adjacent to the click action recess 12n with respect to the angle of rotation θc up to the open position of the lens barrier member 12; its recess width in the circumferential direction is wider than the recess width for performing positional location of the click action ball 37.

Consequently, when the lens barrier member 12A is relatively rotated in the direction D0 from the closed position Pa with respect to the adaptor body 11A, as shown in FIG. 16B, when the click action ball 36 is in a position between the click action recesses 12k and 12m, the click action ball 37 approaches the inclined face 12 p0 of the click action recess 12p.

Next, the action of attaching or removing of the lens barrier device 2A to or from the lens frame 5 and the opening/closing action of this embodiment constructed as described above will be described.

In attaching of the lens barrier device 2A onto the lens frame 5, just as in the case of the lens barrier device 2 of the first embodiment, an attached state of the lens barrier device 2A is obtained when the adaptor body 11A is inserted into the filter screwthread 5b of the lens frame 5 by pressing the bottom end face 14a of the engagement member 14 and thereby releasing the bottom end 14a.

In the attached state of the lens barrier device 2A, when the lens barrier member 12A is in the closed position Pa covering the taking lens 6 (FIG. 12), the click action balls 36 and 37 are inserted into the click action recesses 12k and 12n of the lens barrier member 12A as shown in FIGS. 14A, 14B and 16A, with the result that the lens barrier member 12A is held in the closed position Pa by being subjected to the prescribed click action force. Since, in this state, the click action balls 36 and 37 are respectively in contact with the pair of inclined faces on the inside of the respective click action recesses 12k and 12n, the lens barrier member 12A is held in a state in which it is securely located in the closed position Pa.

In order to put the lens barrier device 2A into the open state, as shown in FIG. 12, the lens barrier member 12A is subjected to a manual rotational operation in the direction D0. By means of this manual operation, the click action balls 36 and 37 escape from the click action recesses 12k and 12n. When, with the rotation of the lens barrier member 12 by the angle θb', it reaches the position Pb' in the vicinity of the boundary within L2 indicating the luminous flux range of the field of view of the range finder within the range of the luminous flux of the photographic subject, as shown in FIG. 16B, the one click action ball 36 is on the inside wall face 12i but the other click action ball 37, as described above, is approaching the inclined face 12 p0 of the click action recess 12p. Consequently, a rotational force is then generated so as to bias the lens barrier member 12A naturally in the direction D0 by sliding and contacting the click action ball 37, and the inclined face 12 p0; as a result, the lens barrier member 12A is automatically moved rotationally in the direction D0.

Then, when the side of the click action ball 36 comes into sliding contact with the inclined face of the click action recess 12m, the lens barrier member 12A is rotated through an angle θc by being subjected to rotational force in the direction of D0 through the click action ball 36, and, as a result, the click action ball 36 is inserted into the click action recess 12m (FIG. 16C). It should be noted that the click action ball 37 does not give, inside the click action recess 12p, a rotational force about the rotary shaft 13 to the lens barrier member.

Thus, the lens barrier member 12A is held with a prescribed click action force in the open position Pc after having been withdrawn from L1, which indicates the range of the luminous flux of the photographic subject (FIG. 12, FIG. 15A and FIG. 15B).

It should be noted that if, when the lens barrier member 12A is in the open position Pc mentioned above, the lens barrier member 12A accidentally comes into contact with some obstacle causing external force in the direction D0 due to this wrong operation to act on the lens barrier member 12A, just as in the case of the lens barrier device 2 of the first embodiment, damage due to this external force is prevented by letting the lens barrier member 12A escape with excess rotational movement.

In addition, just as in the case of the lens barrier device 2 of the first embodiment, if external force such as to produce movement more than the range of the excess rotational movement mentioned above acts on the lens barrier member 12A due to some obstacle, the bottom end face 14a of the engagement member 14 is subjected to pressure by the edge 12a of the lens barrier member 12A, with the result that the engagement between the engagement projection 14b and filter screwthread 5b of the lens frame 5 is released. Due to this release of engagement, the lens barrier device 2A is separated from the lens frame 5, thereby preventing damage being produced by the external force.

It should be noted that in order to put the lens barrier device 2A into the closed state after opening, just as in the case of the lens barrier device 2 of the first embodiment described above, the lens barrier member 12A can be subjected to manual rotation in the direction opposite to D0, thereby returning it to the closed position Pa described above.

With the lens barrier device 2A of the embodiment described above, attaching or removing to or from the lens frame 5 can be achieved in a straightforward manner in the same way as in the case of the lens barrier device 2 of the first embodiment and there is no need to remove the lens barrier device 2A when a photograph is to be taken.

In particular, when a manual releasing operation is performed on the lens barrier member 12A, if the lens barrier member 12A is still within the range of the field of view of the range finder, even if the manual opening operation is unintentionally discontinued, biasing force in the opening direction is still provided by one click action ball 37, so the lens barrier member 12A is rotated to the open position without stopping in the range of the field of view of the range finder (within the range of the luminous flux of the photographic subject); thus the equipment is easy to use with no possibility of a photograph being taken in an inappropriate manner as described above.

Furthermore, even if the lens barrier member 12A which is in the open position Pa accidentally comes into contact with an obstacle when in the open state of the lens barrier device 2A, just as in the case of the lens barrier device 2 of the first embodiment, damage to the lens barrier device 2A is prevented by excess rotational movement of the lens barrier member 12A in the opening direction or by release of engagement with the filter screwthread 5b of the lens frame 5 caused by sliding movement of the engagement member 14.

Next, a lens barrier device according to a third embodiment of the present invention will be described using FIG. 17 and FIGS. 18A to 18C.

Figure 17:
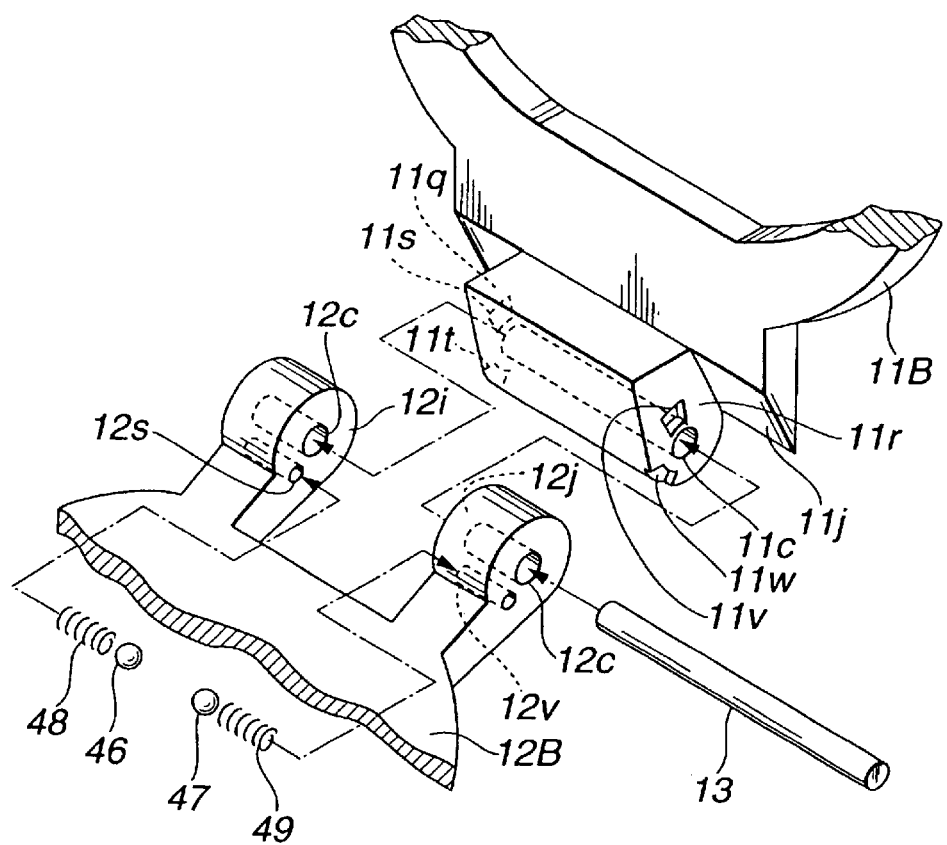
FIG. 17 is an exploded perspective view of the click action support of a lens barrier member and an adaptor body of the lens barrier device of a third embodiment of the present invention.
Figure 18A:
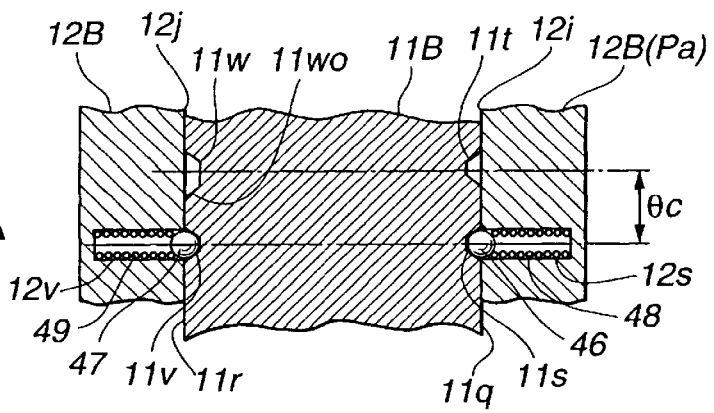
FIG. 18A is a development showing the engaged condition of the click action recess and the click action ball when the lens barrier member of the lens barrier device of FIG. 17 is in the closed position.
Figure 18B:
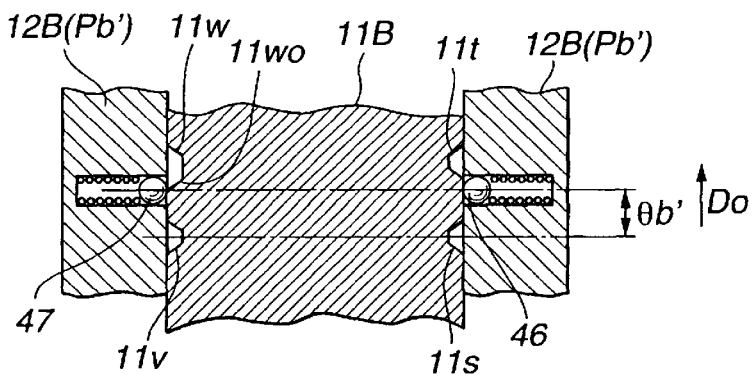
FIG. 18B is a development showing the engaged condition of the click action recess and the click action ball when the lens barrier member of the lens barrier device of FIG. 17 is still within the field of view of the range-finder.
Figure 18C:
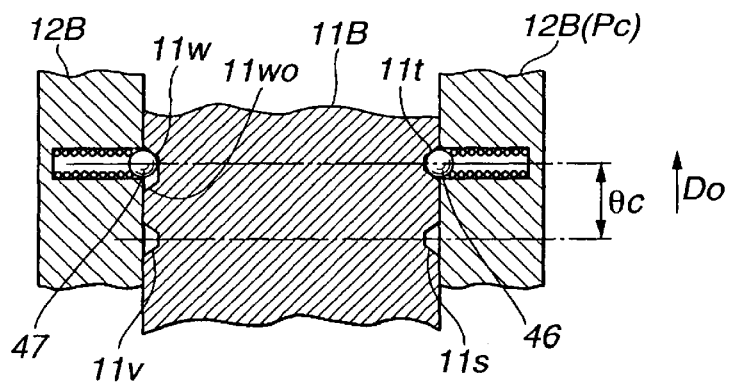
FIG. 18C is a development showing the engaged condition of the click action recess and the click action ball when the lens barrier member of the lens barrier device of FIG. 17 is in the open position.

FIG. 17 is an exploded perspective view of a click action support for the lens barrier member and an adaptor body of the lens barrier device. FIGS. 18A to 18C are developments showing the change of the engaged state of the click action recess and the click action ball of the lens barrier device, FIG. 18A being a development when the lens barrier member is in the closed position, FIG. 18B being a development when the lens barrier member is still within the field of view of the range-finder (within the range of the luminous flux of the photographic subject) and FIG. 18C being a development when the lens barrier member is in the open position, respectively.

In the lens barrier device 2B of this embodiment, the ball click action section and the click action recess which constitute the click action means are arranged contrariwise with respect to the adaptor body and the lens barrier member compared with the lens barrier device 2A of the second embodiment. Specifically, the click action ball is arranged on the lens barrier member while the click action recess is arranged on the adaptor body. The rest of the construction such as for example the construction of the adaptor body or lens barrier member itself, the attaching means (coupling member), attachment release means (edge of the lens barrier member) and so on are the same as in the case of the lens barrier device 2A of the second embodiment. Hereinbelow, the portions that are different will be described. Structural members which are the same are described by giving them the same reference symbols as the reference symbols of the structural members of the first and second embodiments.

As shown in FIG. 17, the ball click action section in the lens barrier device 2B of this embodiment comprises a pair of click action springs 48, 49 which are compression springs, a click action ball 46 constituting a first click action engagement member and a click action ball 47 constituting a second click action engagement member, these constituting a pair. The click action springs 48, 49 are respectively inserted and, in addition, the click action balls 46, 47 are inserted, into oppositely arranged shaft holes 12c of the lens barrier member 12B and into click action ball holes 12s and 12v arranged respectively parallel therewith. The click action balls 46, 47 are held in a state in which they can respectively project towards the outside wall faces 11q and 11r of the adaptor body 11B with being biased in the inwards direction of the bearings.

As click action means, the adaptor body 11B comprises a support having two outside wall faces provided with rotary shaft holes 11c, a first recess which is a click action recess 11s and a second click action recess which is a click action recess 11t being arranged in the vicinity of the rotary shaft hole 11c bored in the one outside wall faces 11q of this support. In addition, likewise as click action means, a first recess which is a click action recess 11v and a third recess which is a click action recess 11w are arranged in the vicinity of a rotary shaft hole 11c bored in the other outside wall face 11r of the support.

The click action ball 46 is capable of sliding to contact with the click action recesses 11s and 11t and the click action ball 47 is capable of sliding to contact with the click action recesses 11v and 11w.

Also, as shown in FIGS. 18A and 18C, the click action recesses 11s and 11t are in positions where their angle of arrangement with respect to the center of the rotary shaft 13 is equal to the opening/closing rotation angle θc of the lens barrier member 12B, and their respective recess widths in the circumferential direction being a width such that positional location of the click action ball 46 can be achieved.

The click action recess 11v is arranged in a position opposite the click action recess 11s and its recess width in the circumferential direction is the same recess width as that of the click action recess 11s, i.e., a width such that the positioning of the click action ball 47 can be achieved. In contrast, the click action recess 11w has an inclined face 11w0 at a position in the circumferential direction adjacent thereto, on the side of the click action recess 11v, with an angle of rotation θc up to the opening position of the lens barrier member 12B, its recess width in the circumferential direction being a recess width that is wider than the recess width that enables positioning the click action ball 47.

Consequently, when the lens barrier member 12B performs relative rotation from the closed position Pa of FIG.

18A with respect to the adaptor body 11B in the direction D0, as shown in FIG. 18B, and the click action ball 46 is in an intermediate position between the click action recesses 11s and 11t, the click action ball 47 approaches the inclined face 11w0 of the click action recess 11w.

When the click action ball 47 comes into contact with the inclined face 11w0 of the click action recess 11w, the click action ball 47 slides along the inclined face 11w0, with the result that rotational force biasing the lens barrier member 12B in the direction D0 is automatically generated and the lens barrier member 12B automatically performs rotational movement in the direction D0.

When rotation has taken place to a position in which the side of the click action ball 46 has come into contact with the inclined face of the click action recess 11t, the lens barrier member 12B is rotated by an angle θc by being subjected to rotational force in the direction D0 through the click action ball 46, with the result that the click action ball 46 is fitted into the click action recess 12t (FIG. 18C). It should be noted that, at this point, the click action ball 47 does not confer rotational force about the rotary shaft 13 on the lens barrier member 12B in the click action recess 11w.

The lens barrier member 12B is then held by a prescribed click action force in the open position Pc, which is the position withdrawn from L1, which stands for the range of the luminous flux of the photographic subject.

With the lens barrier device 2B of this embodiment, the same benefits are presented as in the case of the lens barrier device 2A of the second embodiment.

As described above, with the lens barrier device according to the present invention, in a lens barrier device capable of being removably attached to the front of the taking lens, it is possible to prevent damage to the device occurring even if the cap accidentally comes into contact with an obstacle or a manual operation is performed in a wrong way in the open state, by releasing the engagement with the lens frame in response to movement of the cap.

Also, with this lens barrier device, the click action force that effects positioning to a prescribed position acts over a wider range, making it possible to move the moving member reliably to the prescribed position and further enabling a compact device to be achieved.

Also, with this lens barrier device that is a lens barrier device capable of being removably attached to the front of the taking lens, there is no need to remove the lens barrier device from the taking lens cylinder when a photograph is taken, making the equipment easy to use in that the barrier member can be moved between a position covering the taking lens and a position withdrawn from the front of the taking lens.

What is claimed is:

1. A lens barrier device comprising:
   a barrier that is movable between a position covering a front of a taking lens and a position withdrawn from the front of said taking lens;
   an engagement member that is capable of being engaged with a filter screwthread of said taking lens for holding said barrier relative to said taking lens;
   a rotary shaft that rotates said barrier between said position covering the front of said taking lens and said position withdrawn from the front of said taking lens; and
   click action means for holding said barrier in one of said position covering the front of said taking lens and said position withdrawn from the front of said taking lens;
   wherein said click action means includes a first recess that holds said barrier in said position covering the front of said taking lens, a second recess that holds said barrier in said position withdrawn from the front of said taking lens, and a first click action engagement member that engages one of said first and second recesses; and
   wherein said click action means includes a third recess arranged between said first recess and said second recess along a rotation path of said barrier, and a second click action engagement member that engages with said third recess, and when said first click action engagement member is between said first recess and said second recess and engagement of said second click action engagement member with said third recess is commenced, said second click action engagement member guides said first click action engagement member into said second recess and guides said barrier into said position withdrawn from the front of said taking lens.

2. A lens barrier device comprising:
   a barrier that is movable between a position covering a front of a taking lens and a position withdrawn from the front of said taking lens;
   an engagement member that is capable of being engaged with a filter screwthread of said taking lens for holding said barrier relative to said taking lens;
   a rotary shaft that rotates said barrier between said position covering the front of said taking lens and said position withdrawn from the front of said taking lens; and
   click action means for holding said barrier in one of said position covering the front of said taking lens and said position withdrawn from the front of said taking lens;
   wherein engagement of said engagement member is released by said barrier when said barrier rotates by more than a predetermined amount in a state in which said barrier is withdrawn from the front of said taking lens; and
   wherein said click action means includes a first recess that holds said barrier in said position covering the front of said taking lens and a second recess that holds said barrier in said position withdrawn from the front of said taking lens and a first click action engagement member that engages one of said first and second recesses;
   in which said click action means includes a third recess arranged between said first recess and said second recess along a rotation path of said barrier, and a second click action engagement member that engages with said third recess, and when said first click action engagement member is between said first recess and said second recess and engagement of said second click action engagement member with said third recess is commenced, said second click action engagement member guides said first click action engagement member into said second recess and guides said barrier into said position withdrawn from the front of said taking lens.

3. A lens barrier device comprising:
   a frame member that is attached to a taking lens;
   a barrier that is movable between a position covering a front of said taking lens and a position withdrawn from the front of said taking lens;
   an engagement member that is capable of being engaged with a filter screwthread of said taking lens for holding said frame member relative to said taking lens;

a rotary shaft that rotates said barrier between said position covering the front of said taking lens and said position withdrawn from the front of said taking lens; and click action means for holding said barrier in one of said position covering the front of said taking lens and said position withdrawn from the front of said taking lens;

wherein engagement of said engagement member is released by said barrier when said barrier has rotated by more than a prescribed amount in a state in which said barrier is withdrawn from the front of said taking lens; and wherein said click action means includes a first recess that holds said barrier in said position covering the front of said taking lens, a second recess that holds said barrier in said position withdrawn from the front of said taking lens, and a first click action engagement member that engages on of said first and second recesses;

in which said click action means includes a third recess arranged between said first recess and said second recess along a rotation path of said barrier, and a second click action engagement member that engages with said third recess, and when said first click action engagement member is between said first recess and said second recess and engagement of said second click action engagement member with said third recess is commenced, said second click action engagement member guides said first click action engagement member into said second recess and guides said barrier into said position withdrawn from the front of said taking lens.

4. A lens barrier device comprising:

attaching means for removably attaching the lens barrier device to a filter screwthread of a taking lens;

a barrier that is movable between a position covering a front of said taking lens and a position withdrawn from the front of said taking lens;

attachment release means for releasing attachment of said lens barrier device to the filter screwthread in response to operation of said barrier when said barrier moves further than said withdrawn position from said covering position; and further comprising click action means for holding said barrier in one of said position covering the front of said taking lens and said position withdrawn from the front of said taking lens;

wherein said attaching means includes an engagement member that engages said filter screwthread, and engagement of said engagement member is released by said barrier when said barrier moves by more than a prescribed amount in a state in which said barrier is withdrawn from the front of said taking lens;

wherein said click action means includes a first recess that holds said barrier in said position covering the front of said taking lens, a second recess that holds said barrier in said position withdrawn from the front of said taking lens, and a first click action engagement member that engages one of said first and second recesses; and wherein said click action means includes a third recess arranged between said first recess and said second recess along a rotation path of said barrier, and a second click action engagement member that engages with said third recess, and when said first click action engagement member is between said first recess and said second recess and engagement of said second click action engagement member with said third recess is commenced, said second click action engagement member guides said first click action engagement member into said second recess and guides said barrier into said position withdrawn from the front of said taking lens.

* * * * *